(12) United States Patent
Keszler et al.

(10) Patent No.: US 8,366,967 B2
(45) Date of Patent: Feb. 5, 2013

(54) METAL CHALCOGENIDE AQUEOUS PRECURSORS AND PROCESSES TO FORM METAL CHALCOGENIDE FILMS

(75) Inventors: Douglas A. Keszler, Corvallis, OR (US); Bejamin L. Clark, Corvallis, OR (US)

(73) Assignee: Inpria Corporation, Corvallis, OR (US)

( * ) Notice: Subject to any disclaimer, the term of this patent is extended or adjusted under 35 U.S.C. 154(b) by 326 days.

(21) Appl. No.: 12/709,834

(22) Filed: Feb. 22, 2010

(65) Prior Publication Data

US 2011/0206599 A1 Aug. 25, 2011

(51) Int. Cl.
*H01B 1/00* (2006.01)

(52) U.S. Cl. ............... 252/500; 106/287.18; 148/33; 423/508

(58) Field of Classification Search ............ 252/500; 106/287.18; 148/33; 423/508
See application file for complete search history.

(56) References Cited

U.S. PATENT DOCUMENTS

| | | | |
|---|---|---|---|
| 4,101,341 A * | 7/1978 | Selders | 136/258 |
| 6,307,148 B1 | 10/2001 | Takeuchi et al. | |
| 6,323,417 B1 | 11/2001 | Gillespie et al. | |
| 6,379,585 B1 | 4/2002 | Vecht et al. | |
| 6,445,015 B1 | 9/2002 | Braddock | |
| 6,875,661 B2 | 4/2005 | Mitzi | |
| 7,341,917 B2 | 3/2008 | Milliron et al. | |
| 7,494,841 B2 | 2/2009 | Mitzi et al. | |
| 7,618,841 B2 | 11/2009 | Mitzi et al. | |
| 8,057,850 B2 * | 11/2011 | Curtis et al. | 427/74 |
| 2005/0158909 A1 * | 7/2005 | Milliron et al. | 438/85 |
| 2005/0202157 A1 | 9/2005 | Wu et al. | |
| 2006/0151331 A1 * | 7/2006 | Taunier et al. | 205/316 |
| 2007/0093059 A1 | 4/2007 | Basol | |
| 2010/0213073 A1 * | 8/2010 | Huang et al. | 205/316 |

FOREIGN PATENT DOCUMENTS

JP 2007-189019 * 7/2007

OTHER PUBLICATIONS

Banger et al., "Synthesis and Characterization of the First Liquid Single-Source Precursors for the Deposition of Ternary Chalcopyrite (CuInS2) Thin Film Materials", Chem. Mater., 13:3827-3829 (2001).
Belgacem et al., "Preparation of Copper Indium Disulphide Films by Airless Spraying", Thin Solid Films, 167:217-222 (1988).
Bombicz et al, "Synthesis, vibrational specra and X-ray structures of copper (I) thiourea complexes", Inorganica Chimica Acta, 357:513-525 (2004).
Bott et al, "Crystal Structure of [Cu4(tu)7(SO4)2] H2O and Vibrational Spectroscopic Studies of Some Copper (I) Thiourea Complexes", Inorg. Chem., 37:651-657 (1998).
Cook et al., 44th Midwest Regional Meeting of the American Chemical Society, Iowa City, IA, United States, Oct. 21-24, 2009 Abstract.

(Continued)

*Primary Examiner* — Khanh Tuan Nguyen
(74) *Attorney, Agent, or Firm* — Dardi & Herbert PLLC; Peter S. Dardi; Mengmeng Fahrni (57) ABSTRACT

Metal chalcogenide precursor solutions are described that comprise an aqueous solvent, dissolved metal formate salts and a chalcogenide source composition. The chalcogenide source compositions can be organic compounds lacking a carbon-carbon bond. The precursors are designed to form a desired metal chalcogenide upon thermal processing into films with very low levels of contamination. Potentially contaminating elements in the precursors form gaseous or vapor by-products that escape from the vicinity of the product metal chalcogenide films.

17 Claims, 6 Drawing Sheets

OTHER PUBLICATIONS

Fahoume et al., "One, step electrodeposition of Cu(Ga, In)Se2 thin films from aqueous solution", J. Phys. IV France, 125:75-80 (2005).

Garg et al., "Characterization of p-CuInse2 Films for Photovoltaics Grown by a Chemical Deposition Technique", Thin Solid Films, 164:269-273 (1988).

Ginley et al., "Nanoparticle Precursors for Electronic Materials", Mat. Res. Soc. Symp. Proc., 536:237-244 (1999).

Hillhouse et al., "Solar cells from colloidal nanocrystals: Fundamentals, materials, devices and economics", Current Opinion in Colloid & Interface Science, 14:245-259 (2009).

Hodes et al., "CuInS2, CuInSe2 and CuIn5S8 Layers Prepared by Electrodeposition", Comm. Eur. Communities, Eur. 10025 E.C. Photovoltaic Sol. Energy Conf. 6th, 1985, pp. 846-849.

Hodes et al., "Electrodeposited Layers of CuInS2, CuIn5S8 and CuInSe2", Progress in Crystal Growth and Characterization, 10th Proc. Int. Conf. Ternary Multinary Compd., 6th 1984, pp. 345-351.

Kaneko et al., "Attempt of Spray Pyrolysis Deposition of Various Semiconducting Thin Films for Solar Cells", Photovoltaics for the 21st Century: Electrochemical Society Proceedings vol. 99-11, 1999, pp. 118-127.

Krunks et al., "Structural and optical properties of sprayed CuInS2 films", Thin Solid Films, 338:125-130 (1999).

Krunks et al., "Copper Sulfides by Chemical Spray Pyrolysis Process", Physica Scripta., T69:189-192 (1997).

Lu et al., "Synthesis of Nanocrystalline CuMS2 (M=In or Ga) through a Solvothermal Process", Inorg. Chem., 39:1606-1607 (2000).

Mitzi et al., "Hydrazine-based deposition route for device-quality CIGS films", Thin Solid Films, 517:2158-2162 (2009).

Mitzi et al., "A High-Efficiency Solution-Deposited Thin-Film Photovoltaic Device", Adv. Mater., 20:3657-3662 (2008).

Podder et al., "Preparation and characterization of CuInS2 thin films from aqueous solutions by novel photochemical deposition technique", Journal of Crystal Growth, 275:e937-e942 (2005).

Terasako et al., "Structural, Optical, and Electrical Properties of CuInS2 Thin Films Prepared by Chemical Spray Pyrolysis", Phys. Stat. Sol., 3(8):2588-2591 (Sep. 2006).

van Duren et al., "The Next Generation of Thin-film Photovoltaics", Mater. Res. Soc. Symp. Prov., 1012:259-268 (2007).

Vedel et al., "Preparation du sulfure cuivreux par decomposition thermique d'aerosol (SPRAY)", Revue Phys. Appl., 15:1521-1528 (1980) (with English Abstract).

Yan et al., "Formation of CuS submicrotubes with quadrate cross section", Materials Research Bulletin, 44:1360-1365 (2009).

Yukawa et al., "Electrodeposition of CuInS2 from aqueous solution (II) Electrodeposition of CuInS2 film", Thin Solid Films, 286:151-153 (1996).

\* cited by examiner

METAL CHALCOGENIDE AQUEOUS PRECURSORS AND PROCESSES TO FORM METAL CHALCOGENIDE FILMS

FIELD OF THE INVENTION

The invention relates to solution based approaches for the synthesis of metal chalcogenides as well as improved precursor solutions that can form high quality low contaminant metal chalcogenides. The invention further relates to formation of thin films of metal chalcogenides.

BACKGROUND OF THE INVENTION

Metal chalcogenides generally refer to metal sulfides, metal selenides and metal tellurides. These materials can have desirable properties for the formation of functional elements. For example, some of these materials are phosphors and/or semiconductors. Due to the functional properties of some of these materials, there is significant commercial interest in these materials for appropriate applications. The quality of the materials can be significant with respect to the ability to produce desired commercial products. At the same time, commercial pressures to produce goods at lower costs create separate challenges.

Semiconductors are an important class of commercial materials. In particular silicon semiconductors find wide use in electronics as well as for other semiconductor applications. However, other semiconductors also find wide commercial use. With the rapid growth of alternative energy sources in view of rising energy costs, significant commercial importance of semiconductors also extends to applications in the formation of solar cells. In solar cells, semiconductors function to generate a photocurrent that is harvested to provide useful work. For solar applications, the semiconductor band gap can be selected for the absorption of appropriate light wavelengths for natural solar light.

SUMMARY OF THE INVENTION

In a first aspect, the invention pertains to a metal chalcogenide precursor solution comprising an aqueous solvent having dissolved a metal cation, formate anions, and a chalcogenide composition selected from the group consisting of thiourea, thioformamide, selenourea, selenoformamide and a combination of thereof.

In a further aspect, the invention pertains to a method for preparing an aqueous precursor of a metal chalcogenide, the method comprising forming an aqueous solution comprising a metal cation, formate anions, and a chalcogenide composition selected from the group consisting of thiourea, thioformamide, selenourea, selenoformamide or a combination of thereof.

In another aspect, the invention pertains to a method for the formation of a metal chalcogenide film. In some embodiments, the method comprises annealing a precursor layer at a temperature from about 50° C. to about 750° C. in which the precursor layer comprises a metal cation, formate anions, and a chalcogenide composition selected from the group consisting of thiourea, thioformamide, selenourea, selenoformamide or a combination of thereof.

DETAILED DESCRIPTION OF THE INVENTION

Solution based synthesis processes have been discovered that can form high quality metal chalcogenide films using an aqueous solution based process that can avoid compositions that introduce contaminants and that avoid particularly hazardous compounds. In some embodiments, the precursor solutions can comprise a formate anion along with the cation of the desired metal or metals. The solutions can also comprise thiourea, thioformamide, selenourea or selenoformamide as sources of the chalcogenide atom. The precursor solutions are suitable for depositing or printing to produce a precursor layer that can be processed to form a metal chalcogenide film. Due to the design of precursor solutions free from halogen atoms and carbon-carbon bonds, the precursors can be processed into high quality metal chalcogenide films with significantly lower contaminant levels compared with some other solution based processes. The precursors can be converted to desired films using a thermal process at moderate temperatures. The improved precursor solutions can be processed into quality metal chalcogenide films with a desirable high level of purity and with a high level of uniformity as well as ready commercial adaptability. The precursor solutions generally comprise an aqueous solvent which further provides handling and environmental benefits.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

Chalcogen elements are the sulfur, selenium and tellurium elements, and chalcogenides are sulfide, selenide and/or telluride compositions that have sulfur, selenium and/or tellurium anions. Oxygen is within the same group of the periodic table, but oxygen is not considered a chalgogen atom as used herein, although there is not absolute consensus on the terminology in the art. Metal chalcogenides are compounds with the chalcogen element bonded with a metal element. Metal chalcogenides can have electronic structures that can be exploited for desirable applications. For example, some metal sulfides can function as phosphors, which can emit light through fluorescence or phosphorescence upon suitable excitation.

Also some metal chalcogenides are semiconductors, which can be further doped for adjusting the electronic properties. For example, desirable semiconductors can be formed from compounds with a transition metal atom, a p-group metal atom and a chalcogenide atom. D-group metals are metals in groups 3-12 of the periodic table of elements. P-group metals are metals in the post-transition metal portion of the periodic table including, aluminum, gallium, indium, thallium, tin, lead, phosphorous, arsenic, antimony, bismuth and polonium. Semiconductor metal chalcogenides are useful for the formation of electrical circuits, as described further below. In addition, some semiconductors can be used for the production of solar cells, which is a rapidly growing market.

For some embodiments, it is desirable to form large area semiconductor films. In particular, large area semiconductor films can be used, for example, to form solar cells and/or display circuits. The processes described herein can be used to form uniform metal chalcogenide films for appropriate applications, such as large area structures. The precursor solutions described herein provide for processing under relatively low temperature conditions to form a film of metal chalcogenide with very low levels of impurities. In particular, the films can have very low levels of impurities of carbon atoms, halogen atoms and oxygen atoms. The resulting films can have desirable electrical properties due to the low levels of impurities.

In general, the precursor solutions comprise formate anions. The metal cations in the solution have corresponding anions to provide electrical neutrality. The use of formate anions provides an anion that effectively does not contribute contaminants during the processing of the precursor solutions into metal chalcogenide films. In particular, the formate anions are organic ions free of carbon-carbon bonds as well as halogen atoms. During thermal processing of the precursor into the metal chalcogenide films, the formate anions react to form gaseous or vapor species as a by-product that leave the film to carry away potential contaminants such that a high quality low contaminant film can be produced. Due to the efficient removal of the formate anions during thermal processing, the formate anions also similarly do not leave significant oxygen contamination in the product semiconductor films. In contrast with the precursors described herein, precursors with compounds having carbon-carbon bonds tend to result in product films with significant carbon contamination as well as potentially oxygen contamination. The precursor solutions described herein generally also avoid the use of halogen salts or other halogen sources, which can introduce halogen contaminants.

Conventional approaches for the formation of layers of metal chalcogenides include, for example, chemical vapor deposition and physical vapor deposition. These processes are generally performed under high vacuum. While these vacuum approaches can form solid films of metal chalcogenides, the high vacuum approaches have high capital costs, high energy consumption, significant process complexity, inefficient material usage and low throughput. Furthermore, it is difficult to form large area films with vacuum approaches with a high degree of uniformity. In particular, thermal co-evaporation is a vacuum-based approach for the deposition of photovoltaic absorber materials, $CuInSe_2$ and $CuGaSe_2$. However, ternary, quaternary, and higher order materials produced with vapor deposition techniques are difficult to form with uniformity in thickness and composition due to complexities of maintaining evaporation or sputtering of different target materials at selected rates. Thus, for these materials, capital costs and process complexity are even greater than for other materials formed in high vacuum techniques.

Several solution based synthesis approaches have been performed for metal chalcogenides. For example, Krunks et al. have described the spray deposition of aqueous solutions comprising metal chloride salts and thiourea for forming $CuInS_2$ films. The solutions were sprayed onto heated substrates. Polycrystalline films were formed. See, Krunks et al., "Structural and optical properties of sprayed $CuInS_2$ films," Thin Solid Films 338 (1999) pp 125-130 and Terasako et al., "Structural, Optical, and Electrical Properties of $CuInS_2$ Thin Films Prepared by Chemical Spray Pyrolysis," Phys. Stat. Sol. 3(8) (September 2006) 2588-2591, both of which are incorporated herein by reference. In contrast, the films described herein can be free of halogen contaminants and can have high degrees of uniformity.

Also hydrazine has been used to dissolve sulfur or selenium elements into a solution. The corresponding metals have been supplied as acetates. These solutions have the disadvantage with respect to forming the desired semiconductors that the hydrazine is very toxic and difficult to handle and the acetates leave carbon contamination in the product material. These approaches are described further in U.S. Pat. No. 6,379,585 to Vecht et al., entitled "Preparation of Sulfides and Selenides," incorporated herein by reference. Another approach is based on using hydrazinium metal chalcogenides as the precursor materials. This approach is described in U.S. Pat. No. 7,618,841 to Mitzi et al., entitled "Hydrazine-Free Solution Deposition of Chalcogenide Films," incorporated herein by reference. However, these approaches use the toxic and reactive hydrazine in earlier steps for the formation of the precursors.

The metal chalcogenide precursor solutions described herein comprise an aqueous solvent, a metal formate salt and a sulfur and/or selenium source, which is thiourea, thioformamide, selenourea, selenoformamide or a combination of thereof. Optional additional components of the precursor solutions include, for example, a volatile organic solvent and/or formic acid. Volatile organic solvents generally should be miscible or soluble in water and be sufficiently volatile that the organic solvent is removed by evaporation at an appropriately early stage of thermal processing to form the product film such that these organic compounds do not contribute contaminants. Suitable organic solvent compositions include, for example, alcohols, such as methanol, ethanol or isobutyl alcohol. In general, the solvent generally is at least about 50 weight percent water. An optional organic solvent and the amount thereof can be selected to adjust the viscosity, the volatility and the surface tension of the precursor solution. Formic acid can be added to adjust the pH of the precursor solution, and additional formate ions from the formic acid do not alter the thermal processing for the formation of the metal chalcogenide. The surface tension of the precursor solution decreases with increasing formic acid-to-water ratio, which can provide improved spin coating characteristics and some advantages for other deposition techniques, such as inkjet printing. The surface tension of pure water and formic acid mixtures ranges from about 72 mN/m to about 37 mN/m. The presence in the solution of additional formate anions can further stabilize the solution and can reduce or eliminate unwanted precipitation of oxides or hydroxides. The formate anions are observed to react to form vapor or gaseous by-products during the thermal processing of the film such that the product film is effectively free of carbon or oxygen contamination. In general, the pH can be adjusted to a value from about 2.0 to about 4.0. A person of ordinary skill in the art will recognize that additional ranges of solvent concentrations and pH within the explicit ranges above are contemplated and are within the present disclosure.

In general, the metal chalcogenides can be formed with one or more selected metal elements. Suitable metals generally include all of the metals of the periodic table and combinations thereof. While in principle, alkali chalcogenides and alkali earth chalcogenides with metals of group 1 and group 2 of the periodic table of elements can be formed, alkali chalcogenides and alkali earth chalcogenides generally are unstable in the presence of water and/or are dissolved by water so that they are not useful for many applications. Metals of particular interest include the d-group metals and p-group metals. D-group metals include metals found in groups 3-12 of the periodic table. The term transition metals can be used to reference the d-group elements, but some accepted definitions of the term "transition metals" exclude group 12 elements Zn, Cd and Hg since these elements have full d-shells. The term d-group elements is used herein for group 3-12 elements of the periodic table, including the lanthanides and actinides, transition metals and Zn, Cd, and Hg for the avoidance of any ambiguity. P-group metals include the metals of groups 13-15 that are metals, specifically, Al, Ga, In, Tl, Sn, Pb, Sb, P, As, Po, and Bi.

In general, the metal chalcogenide compositions can comprise a single metal element or a plurality of metal elements, such as two metal elements, three metal elements, four metal elements, five metal elements or more than five metal elements. Some metal chalcogenides are semiconductors and have applications that take advantage of these semiconducting properties. So called II-VI semiconductors include both sulfide and selenide semiconductors, such as CdSe, CdS, ZnS, and ZnSe. So called group IV-VI semiconductors include, for example, PbS, PbSe, and SnS. At least some of these semiconductors and their doped forms can be used also as phosphor materials, which emit light following a suitable excitation. Small amounts of additional metals can be introduced using the processes described herein as dopants, which may be desirable for some compositions to change, for example, the electron mobility and/or the phosphor properties. Sulfide and selenide doped phosphors are described further, for example, in U.S. Pat. No. 6,379,585 to Vecht et al., entitled "Preparation of Sulphides and Selenides," incorporated herein by reference.

Another class of metal chalcogenides of interest includes, for example, compounds with at least one d-group metal and one p-group metal. In particular, some of these compound semiconductors are of particular interest due to their suitability for the formation of solar cells. For example, some of these compositions have strong absorption of light, e.g., visible light, in the frequency range with significant intensity in solar light. Absorption of visible light generates conduction electrons that can be harvested as a photocurrent. So called group I-III-VI semiconductors, based on corresponding periodic table notation, are of particular interest for solar cell applications. In this notation, the composition has at least one element from corresponding groups in the periodic table. Specifically, I refers to group 1B or group 11 of the periodic table (Cu, Ag, Au), III refers to group IIIB or group 13 of the periodic table (B, Al, Ga, In and Tl) and VI refers to group VIA or group 16 of the periodic table (O, S, Se, Te, Po). Particular compositions of interest include, for example, compounds approximately represented by the formulas $CuInS_2$, $CuInSe_2$, $CuGaS_2$, $CuGaSe_2$, $AgInS_2$, $AgInSe_2$, $AgGaS_2$, $AgGaSe_2$, $CuIn_xGa_{1-x}Se_2$, $CuIn_xGa_{1-x}Se_2$, $CuAlS_2$, $CuAlSe_2$, and $CuIn_xGa_{1-x}S_{2y}Se_{2-y}$. Suitable other I-III-VI semiconductors can similarly be used. In general, x is in the range from 0 to 1 and y is similarly in the range from 0 to 2. In some embodiments of interest, y=0 such that the formula reduces to $CuIn_xGa_{1-x}Se_2$. In additional or alternative embodiments, x can be in the range from 0.5 to about 0.85, in further embodiments from about 0.6 to abut 0.8 and in additional embodiments from about 0.65 to about 0.75. Also, some compositions can be slightly copper deficient relative to the reference formula. A person of ordinary skill in the art will recognize that additional ranges of x within the explicit ranges above are contemplated and are within the present disclosure. The syntheses of films for three representative I-III-VI semiconductors are described in the example below.

The precursor solutions generally can comprise a roughly stoichiometric amount of the selected metal element(s). The total metal concentration of the precursor solution is generally from about 0.01 to about 3 molar, in further embodiments from about 0.02 to about 2 molar, and in additional embodiments from about 0.05 to about 1 molar. The precursor solution generally comprises the chalcogenide composition in a concentration from about 0.03 to about 15 molar, in further embodiments from about 0.05 to about 12 molar and in additional embodiments from about 0.1 to about 10 molar. A person of ordinary skill in the art will recognize that additional ranges of total metal concentration and chalcogenide composition concentrations within the explicit ranges above are contemplated and are within the present disclosure.

The precursor solutions can be thermally processed to form the desired metal chalcogenide films. Based on the design of the precursors, the elements other than the metal elements and the chalcogen elements are essentially removed as gaseous or vapor by-products such that the product metal chalcogenide films are very pure. Prior to performing the thermal conversion, the precursor solution can be deposited at desired locations along a substrate surface. Suitable deposition techniques include, for example, spin coating, dip coating, spray coating, extrusion, knife edge coating, slot coating and printing. Similarly, any reasonable printing technique can be used, such as, screen printing, block printing, gravure printing, inkjet printing and the like.

In general, the precursor solution is deposited onto a suitable substrate for further processing. The substrate generally can be selected based on the desired application of the material. However, the substrate can be selected such that the substrate tolerates the processing temperatures used to form the metal chalcogenide material, and the temperature ranges are described further below. The substrate can comprise a plurality of materials, for example, in layers. Suitable materials for substrates or portions thereof include, for example, elemental metals, alloys, elemental metalloids, such as silicon, polymers, such as thermally stable polymers, e.g., polyimides and polycarbonates, and ceramic compositions, such as metal oxides, metalloid oxides, metal carbides, metalloid carbides, metal nitrides, metalloid nitrides, or the like.

The precursor solution can be deposited uniformly over an entire surface of a substrate, or at different thicknesses at selected portions of a substrate. Similarly, the precursor can be deposited only over a selected portion of the substrate. In this way, the substrate can be patterned with the precursor if desired. If the precursor solution has appropriate viscosity and/or surface tension and/or if the precursor solution is dried reasonably promptly following deposition, the product metal chalcogenide is located approximately along the locations at which the precursor was deposited. Thus, the patterning of the precursor deposition can result in corresponding patterning of the metal chalcogenide along the substrate surface, assuming that the material does not flow significantly during the thermal processing to form the metal chalcogenide. Some of the precursor deposition approaches are suitable for uniform deposition of the substrate while some deposition approaches are suitable for patterning of the deposited precursors, and of course some approaches are suitable for either uniform deposition or patterning. Each deposited layer or portion thereof can have a thickness from about 5 nanometers (nm) to about 10 microns, in further embodiments from about 25 nm to about 2.5 microns and in additional embodiments from about 50 nm to about 2.0 microns. The thickness of the deposited precursor can be estimated from the deposited volume and the area of deposition. A person of ordinary skill in the art will recognize that additional ranges of deposited layer thickness within the explicit ranges above are contemplated and are within the present disclosure.

Following deposition of the precursor solution, it can be desirable to at least partially dry the composition prior to performing further processing. The composition can be generally dried by heating the structure under conditions where the solvent can evaporate. The rate of drying depends on the drying temperature and other processing conditions as well as the thickness of the deposited precursor. Generally, the drying can be performed at temperatures from about 40° C. to about 200° C., in further embodiments from about 60° C. to about 180° C. and in additional embodiments from about 80° C. to about 175° C. A person of ordinary skill in the art will recognize that additional ranges of drying temperatures within the explicit ranges above are contemplated and are within the present disclosure. The drying temperature is generally selected to be less than the reaction temperature for the formation of the metal chalcogenide. The drying can stabilize the structure and reduce contamination of the product material due to elements from the solvent. The heating can be performed in any reasonable way, such as through heating the substrate, placing the structure in an oven or the like, shining a heat lamp on the structure or other convenient approach. The time of the drying step can be selected based on the drying approach to achieve the desired degree of drying.

In some embodiments, to achieve better control over the deposition and drying process, the process can be repeated with selected amounts deposited in each step. A single layer can be deposited and dried prior to reacting the dried material to form the metal chalcogenide, or a plurality of layers can be sequentially deposited and dried prior to reacting the dried material. The number of layers sequentially deposited and dried can be, for example, 2 layers, three layers, four layers or more than four layers. In some embodiments, the dried film can have at least about 50 percent of the solvent removed, in further embodiments at least about 70 percent of the solvent removed, in additional embodiments at least about 75 percent of the solvent removes and in other embodiments at least about 85 percent of the solvent removed. In some embodiments, approximately all of the solvent can be removed. A person of ordinary skill in the art will recognize that additional ranges of solvent removal within the explicit ranges above are contemplated and are within the present disclosure.

The precursor, generally after drying, can be heated to react the precursor to form the product metal chalcogenide. The formate anions and remaining elements from the chalcogenide precursors form gaseous or vapor by-products that leave the metal chalcogenide material. To react the precursor, the precursor generally is heated to a temperature from about 350° C. to about 800° C., in further embodiments from about 400° C. to about 750° C. and in additional embodiments from about 425° C. to about 700° C. A person of ordinary skill in the art will recognize that additional ranges of temperatures within the explicit ranges above are contemplated and are within the present disclosure. The heating to drive the reaction can be supplied in any reasonable approach, such as through heating in an oven or the like. In some embodiments, the heating is performed with rapid thermal annealing or rapid thermal processing. With rapid thermal annealing, the structure can be heated very quickly, for example, using a pulsed discharge lamp, heat lamp or hot plate. The heated structure can be cooled more slowly, if desired, based on the thermal stresses within the structure. The heating can be performed for an appropriate period of time that generally depends on the heating approach used. The heating can be continued until the precursor is essentially completely converted to the product material.

To reduce contamination from by products formed during the reaction to form the metal chalcogenides, the processing to form a selected thickness of metal chalcogenide films can be divided such that portions of the ultimate film are processed sequentially. Thus, the reactions to form the product material can be repeated following sequential deposition of dried structures onto the previously synthesized metal chalcogenide film. In other words, following the reaction to form a layer of metal chalcogenide, further precursor can be deposited and dried and subsequently reacted to form further metal chalcogenide. As noted above, the deposition and drying steps themselves can be repeated if desired, to form a single thicker dried layer. After the formation of an initial metal chalcogenide material with a coating of dried precursor, the added precursor can be reacted to form additional metal chalcogenide. The process can be further repeated to form additional dried precursor layers and so on. The process can be repeated, for example, a third time, a fourth time, a fifth time or more than five times, to from a desired thickness of metal chalcogenide material. It has been surprisingly found that a highly crystalline material can be formed through the sequential deposition and process of the metal chalcogenides. Specifically, it has been found that the resulting crystals can have sizes greater than the individual layer thicknesses that are sequentially processed into the metal chalcogenide. X-ray diffractograms taken of the product films confirm that the films have at the most a low level of oxygen contamination.

In principle, the metal chalcogenide material can have any selected thickness. For some applications, it is suitable to have a relatively thin layer. These thin layers are suitable for solar cell applications and other semiconductor applications. In some embodiments, the semiconductor layer has an average thickness from about 5 nm to about 20 microns, in further embodiments form about 15 nm to about 17.5 microns and in additional embodiments from about 25 nm to about 15 microns. A person of ordinary skill in the art will recognize that additional ranges of thicknesses within the explicit ranges above are contemplated and are within the present disclosure. The thickness can be estimated based on the density of the material, the area of the structure and the amount of material deposited. Alternatively, the thickness can be measured, for example, using electron microscopy, such as scanning electron microscopy of a cross sectional view of the structure.

Metal chalcogenide materials can be used to form ultra large scale integrated electronic devices based on their semiconducting properties. For example, gallium sulfide materials have been described for the formation of field effect transistors. See, for example, U.S. Pat. No. 6,445,015 to Braddock, entitled "Metal Sulfur Semiconductor Transistor Devices," incorporated herein by reference. The precursors described herein can be patterned to form integrated semiconductor devices. Also, metal chalcogenide phosphors can be patterned to form elements of a display device. The formation of a patterned metal chalcogenide for use in a display is described in published U.S. patent application 2005/0202157A to Wu et al., entitled "Method of Forming Thick Film Dielectric Layer in an Electroluminescent Laminate," incorporated herein by reference.

The I-III-VI semiconductors described above can form p-type semiconductors that are useful for the formation of solar cells, such as a compound semiconductor solar cell. An n-type semiconductor can be placed adjacent the p-type semiconductor to form a structure that is involved in the function of the solar cell. In some embodiments, the solar cell can further comprise a glass substrate with a molybdenum layer on the glass substrate with the p-type semiconductor placed on the molybdenum layer. A transparent electrode can be placed on the n-type semiconductor, and a current collector can be in electrical contact with the transparent electrode. The p-type semiconductor layer can be formed using the precursors and processes described herein. Suitable solar cell structures are described further, for example, in U.S. Pat. No. 6,307,148 to Takeuchi et al., entitled Compound Semiconductor Solar Cell and Production Method Thereof," incorporated herein by reference. The use of sputtering and the associated difficulties are described, for example, in published U.S. patent application 2007/0093059A to Basol, entitled "Method and Apparatus for Thin Film Solar Cell manufacturing," incorporated herein by reference.

EXAMPLES

Example 1

Preparation of a $CuInS_2$ Precursor Solution

This example demonstrates that formation of a single-source precursor solution of $CuInS_2$ (CIS), which was processed into a film as described in Example 2.

A 0.005 mole quantity of $Cu(COOH)_2.4H_2O$ (1.1276 g) was added to 20 mL of a 1 molar aqueous thiourea solution. The solution was capped and allowed to stir for 24 hours. The resulting solution was filtered to remove any precipitate, leaving a clear, colorless copper-thiourea formate complex solution. Also, a 0.25 molar indium formate solution was prepared by dissolving indium metal in 5M formic acid. The copper-thiourea formate complex solution was added to 20-mL of the indium formate solution to form a copper-indium-sulfide (CIS) precursor solution. The CIS precursor solution was allowed to evaporate in air to achieve a desired concentration, typically on the order of 2 molar, yielding a clear, slightly yellow solution.

Example 2

Formation of a Film of $CuInS_2$

This example demonstrates the formation of a crystalline $CuInS_2$ film from the precursor solution prepared as described in Example 1.

Figure 1:
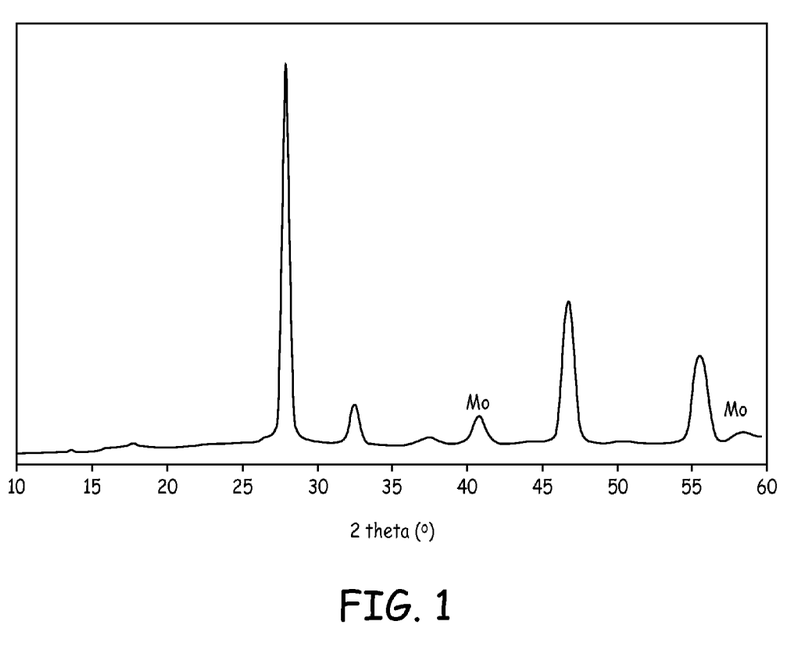
FIG. 1 is an x-ray diffractogram of a crystalline $CuInS_2$ film formed from the precursors described herein on a Mo-coated glass substrate. XRD lines from the Mo substrate are marked.
Figure 2:
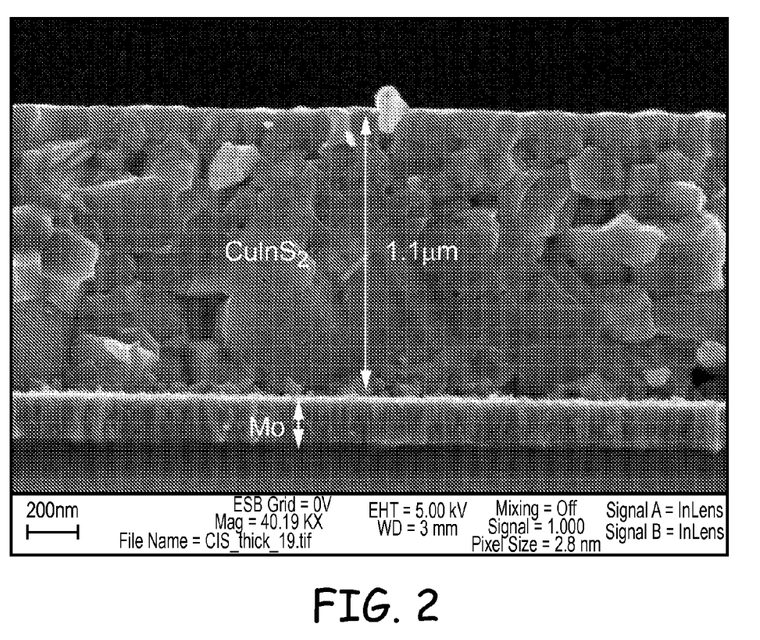
FIG. 2 is a scanning electron micrograph of a cross section taken through a 1.1 micron thick layer of crystalline $CuInS_2$ film on a Mo-coated glass substrate.

In this example, Mo-coated glass substrates (25 mm×25 mm) were used. The substrate surface was prepared by exposing it to a reactive-ion $O_2$ plasma for 15 minutes. A 20 ml quantity of the precursor solution from Example 1 was added to a syringe capped with a 0.45-μm PTFE filter, and the precursor solution was then deposited onto the surface from the syringe. The precursor solution was then spin coated onto the prepared Mo-coated glass substrate, and the coated substrate was treated with a 2-minute hot plate bake of 150° C. to remove at least a substantial portion of the solvent. The coating and drying process was repeated 2 times. After the third coat, the film was rapid thermally annealed (RTA) to 550° C. with an infrared lamp for 5 minutes in an Ar atmosphere. These coating and RTA annealing steps were repeated with three coating steps for each RTA annealing step until the desired thickness was achieved. In the current example, the coating and RTA annealing steps were repeated such that the RTA was performed 8 times to achieve a $CuInS_2$ film thickness of 1.1 μm. Crystalline, single phase $CuInS_2$ was confirmed with an x-ray diffractogram XRD, which is shown in FIG. 1. FIG. 2 is a scanning electron (SEM) micrograph of the resulting film of current example and provides proof of effective interaction between each of the 8 layers, as evidenced by the large grains of CIS observed.

Example 3

Formation of Precursor Solutions for $CuIn_{1-x}Ga_xS_2$

This example describes the formation of precursor solutions for a series of compositions approximately represented by the formula $CuIn_{1-x}Ga_xS_2$, which are prepared in a similar manner as CIS solutions above.

A stock solution of gallium formate was prepared by first dissolving $Ga(NO_3)_3.xH_2O$ in 30 mL of $H_2O$, and then precipitating gallium hydroxide by slowly adding 4 molar $NH_3$ (aq) while stirring. The precipitate was centrifuged and rinsed with $H_2O$ a total of 4 times. The rinsed precipitate was then dissolved in 10 mL of concentrated formic acid, which was followed by dilution to the desired Ga concentration. Empirical determination of concentrations was carried out by evaporation and calcination of the solutions. All three starting solutions, gallium formate, indium formate and copper-thiourea formate complex solution, were mixed in the desired stoichiometric quantities, and then heated to evaporate solvent to obtain a solution a ~2M concentration. A series of solutions were formed with different relative amounts of gallium. These precursor solutions were used to form films as described in the following example.

Example 4

Forming Films of Crystalline $CuIn_{1-x}Ga_xS_2$

This example demonstrates the formation of crystalline films of $CuIn_{1-x}Ga_xS_2$ from the precursor solutions described in Example 3.

Figure 3:
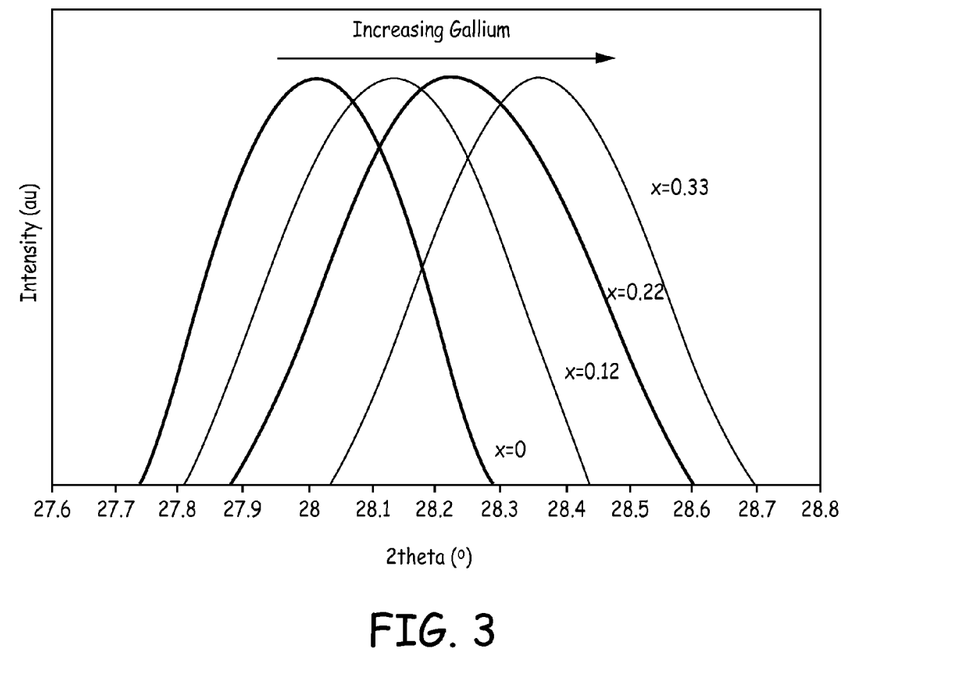
FIG. 3 is a plot of an XRD pattern of (112) peaks of $CuIn_{1-x}Ga_xS_2$ series of compositions formed as crystalline films for 4 different values of x.
Figure 4:
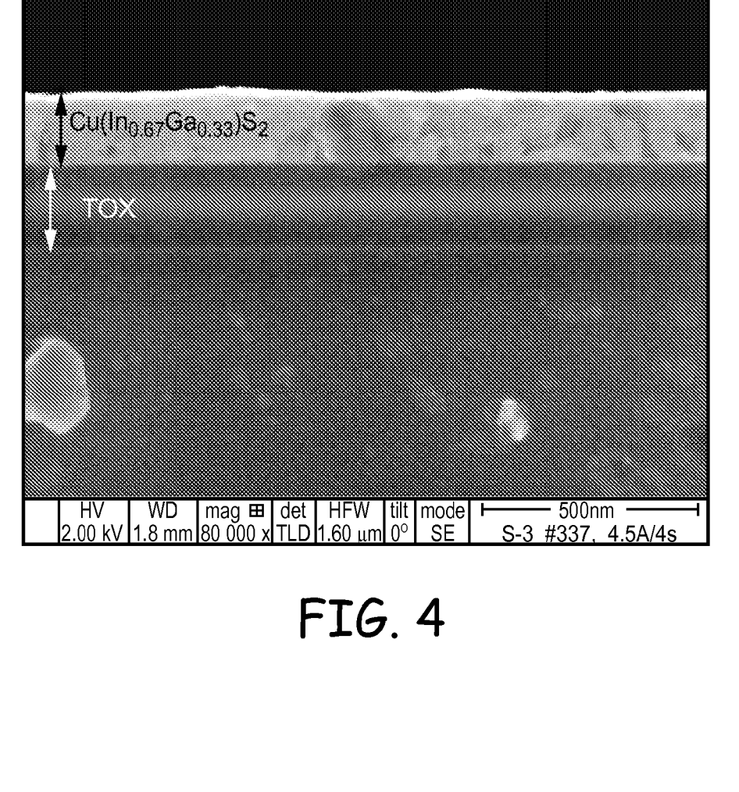
FIG. 4 is a scanning electron micrograph of a cross section through a film comprising $CuIn_{0.67}Ga_{0.33}S_2$.

In this example, Si substrates were used with an approximately 200 nm thick coating of a thermally grown oxide (TOX). The TOX coated substrates were cleaned in dilute KOH at 45° C. for 1 hour and triple rinsed with $H_2O$ before use. To form thin metal sulfide films, the precursor solution was filtered through a 0.45-μm PTFE filter onto the TOX coated substrates. The filtered precursor solution was then spin coated onto the substrate and baked on a hotplate for 2 minutes at 150° C. to remove at least a portion of the solvent. The spin coating and drying process was repeated 3 more times, then the dried film was annealed at 550° C. for 5 minutes under Ar atmosphere using an RTA process. The coating and RTA annealing processes were repeated, with three coating and drying steps for each RTA anneal step, until the desired thickness was achieved. The thickness resulting from a particular coating step is dependent on solution concentration. In this example, the coating and RTA anneal processes were performed a total of 3 times. XRD analysis indicates the presence of single phase $CuIn_{1-x}Ga_xS_2$ for x=0, 0.12, 0.22, 0.33. FIG. 3 is a plot of a subset of XRD data demonstrating a systematic shift of the (112) reflection of $CuIn_{1-x}Ga_xS_2$ system to higher 2(theta) angles with increasing gallium substitution in the aqueous single-source precursor (peak intensities have been normalized for ease of comparison.) An SEM micrograph of a representative $CuIn_{0.67}Ga_{0.33}S_2$ film is given in FIG. 4. The strong interaction between layers resulting in large grain size formation can be observed in the micrograph of FIG. 4.

Example 5

Preparation of a Metal Selenide Precursor

This example demonstrates the formation of a metal selenide precursor solutions suitable for the formation of a $CuInSe_2$ film.

A 0.00124 mole quantity of copper formate tetrahydrate was added to 40 mL of an aqueous solution of 0.125M selenourea. The aqueous solution was capped and allowed to stir 24 hours. Any precipitates were then filtered after the stirring was completed to obtain a clear, reddish-brown filtered solution. The filtered solution was added to 5 mL of aqueous 0.25M indium formate solution. A 2 mL quantity of formic acid was added, and the mixture was allowed to evaporate to a concentration of ~0.3M.

Example 6

Formation of a $CuInSe_2$ Film

This example demonstrates the formation of a crystalline $CuInSe_2$ film from the precursor solution described in Example 5.

Figure 5:
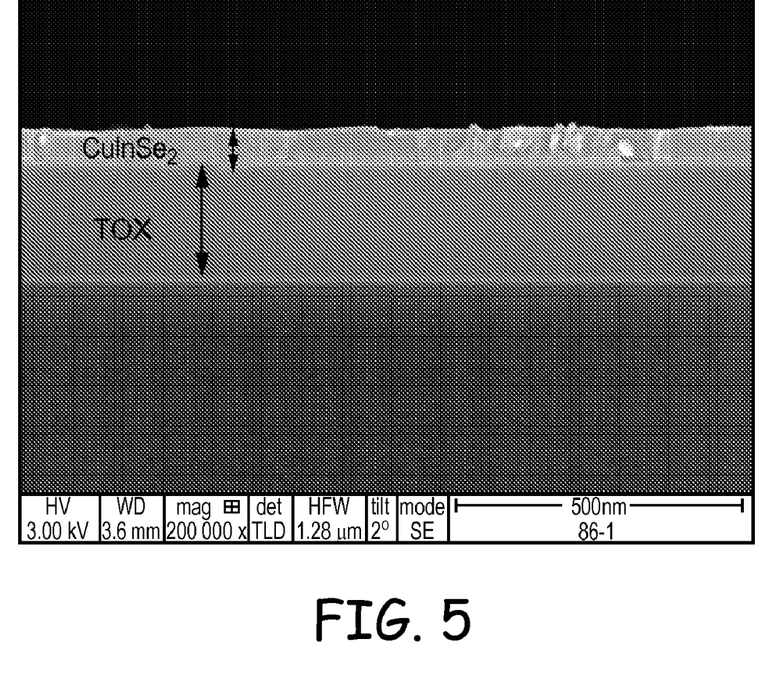
FIG. 5 is a scanning electron micrograph of a cross section through a layer of crystalline $CuInSe_2$ film on an oxidized surface of a silicon substrate.
Figure 6:
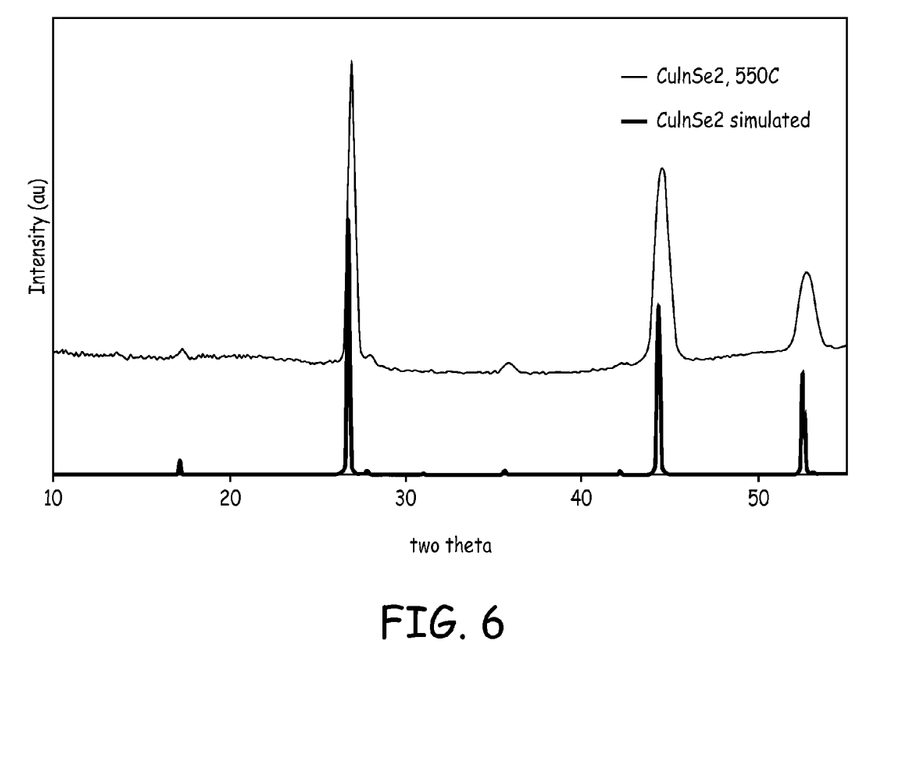
FIG. 6 is a plot of an x-ray diffractogram of a crystalline film of $CuInSe_2$ on an oxidized surface of a silicon substrate.

Thin films of $CuInSe_2$ were fabricated in a similar way as described above in Example 4. The precursor solution was filtered through a 0.45 μm PTFE filter onto a TOX coated silicon substrate. The precursor solution was then distributed with spin coating and baked on a hotplate for 2 minutes at 150° C. The coating and drying process was repeated 7 times, and was followed by a 550° C. RTA for 5 minutes in Ar atmosphere to form the product film. An SEM cross section is given in FIG. 5, demonstrating excellent film morphology. The XRD pattern is given in FIG. 6, demonstrating single phase $CuInSe_2$.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What we claim is:

1. A metal chalcogenide precursor solution comprising an aqueous solvent having dissolved a metal cation, formate anions, and a chalcogenide composition selected from the group consisting of thiourea, thioformamide, selenourea, selenoformamide and a combination thereof, wherein the total cation concentration is from about 0.01 molar to about 3.0 molar.

2. The metal chalcogenide precursor solution of claim 1 wherein the solution comprises a d-block metal cation and a p-block metal cation.

3. The metal chalcogenide precursor solution of claim 2 wherein the d-block metal cation comprises copper.

4. The metal chalcogenide precursor solution of claim 2 wherein the p-block metal cation comprise aluminum, gallium, indium or a combination thereof.

5. The metal chalcogenide precursor solution of claim 1 wherein the solvent comprises formic acid.

6. The metal chalcogenide precursor solution of claim 1 wherein the solvent comprises water and an alcohol.

7. The metal chalcogenide precursor solution of claim 1 wherein the chalcogenide composition comprises thiourea.

8. The metal chalcogenide precursor solution of claim 1 wherein the chalcogenide composition comprises selenourea.

9. The metal chalcogenide precursor solution of claim 1 wherein the concentration of the chalcogenide composition is from about 0.03 molar to about 15.0 molar.

10. The metal chalcogenide precursor solution of claim 1 wherein the solution has a pH from about 2.0 to about 4.0.

11. A method for preparing an aqueous precursor of a metal chalcogenide, the method comprising forming an aqueous solution comprising a metal cation, formate anions, and a chalcogenide composition selected from the group consisting of thiourea, thioformamide, selenourea, selenoformamide or a combination of thereof, wherein the total cation concentration is from about 0.01 molar to about 3.0 molar.

12. The method of claim 11 wherein the metal cation comprises a d-block metal cation and a p-block metal cation.

13. The method of claim 11 wherein the forming of the aqueous solution comprises adding metal formate salts to an aqueous solution of the chalcogenide composition.

14. The method of claim 11 further comprising adjusting the concentration of aqueous precursor solution by providing for the evaporation of a selected amount of solvent to achieve a desired concentration.

15. The metal chalcogenide precursor solution of claim 1 wherein the surface tension of the solution ranges from about 72 mN/m to about 37 mN/m.

16. The method of claim 11 wherein the solution has a pH from about 2.0 to about 4.0.

17. The method of claim 11 wherein the solution comprises formic acid.

* * * * *